United States Patent
Laksin et al.

(10) Patent No.: US 6,772,683 B2
(45) Date of Patent: Aug. 10, 2004

(54) METHOD AND APPARATUS FOR WET TRAPPING WITH ENERGY-CURABLE FLEXOGRAPHIC LIQUID INKS

(75) Inventors: Mikhail Laksin, Scotch Plains, NJ (US); Subhankar Chatterjee, Hampton, NJ (US); Volker Linzer, Carlstadt, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 10/079,781

(22) Filed: Feb. 19, 2002

(65) Prior Publication Data

US 2003/0154871 A1 Aug. 21, 2003

(51) Int. Cl.$^7$ ................................................ B41M 1/18
(52) U.S. Cl. ......................................... 101/211; 101/491
(58) Field of Search ............................. 101/183, 424.1, 101/177, 181, 211, 483, 491

(56) References Cited

U.S. PATENT DOCUMENTS

| | | | |
|---|---|---|---|
| 4,035,214 A | * 7/1977 | Shuppert et al. | ............ 156/240 |
| 4,362,179 A | * 12/1982 | MacPhee et al. | ............... 137/3 |
| 4,860,650 A | * 8/1989 | Houser | ........................ 101/211 |
| 4,939,992 A | 7/1990 | Bird | ............................ 101/183 |
| 5,407,708 A | 4/1995 | Lovin et al. | ................. 427/493 |
| 5,690,028 A | * 11/1997 | Schick | ........................ 101/211 |
| 5,830,927 A | * 11/1998 | Vanderhoff et al. | ........... 522/81 |
| 6,220,156 B1 | 4/2001 | Rohloff | ....................... 101/175 |
| 6,220,157 B1 | 4/2001 | Delwiche et al. | ........... 101/178 |
| 6,283,024 B1 | 9/2001 | George | ........................ 101/182 |
| 6,443,058 B1 | 9/2002 | Stadler et al. | ................. 101/23 |
| 6,546,866 B1 | * 4/2003 | Adachi et al. | ............... 101/366 |

FOREIGN PATENT DOCUMENTS

| EP | 0 984 045 A1 | 3/2000 | ........... C09D/11/10 |
|---|---|---|---|
| JP | 2001279151 | 10/2001 | ........... C09D/11/10 |

* cited by examiner

Primary Examiner—Andrew H. Hirshfield
Assistant Examiner—Leo T. Hinze
(74) Attorney, Agent, or Firm—Sidney Persley

(57) ABSTRACT

The present invention is for a method and associated apparatus whereby low viscosity flexograhic printing inks having a viscosity controlling diluent are used in implementing wet trapping of sequentially applied ink layers by controlling the time between ink layer applications such that sufficient diluent evaporates from an applied layer to increase the first applied layer viscosity sufficiently to wet trap a subsequently applied superposed ink layer.

22 Claims, 1 Drawing Sheet

METHOD AND APPARATUS FOR WET TRAPPING WITH ENERGY-CURABLE FLEXOGRAPHIC LIQUID INKS

FIELD OF THE INVENTION

This invention relates to a method and apparatus for flexographic color printing and more particularly to a method and associated apparatus for implementing a method of wet trap printing also known as "wet trapping" in flexographic printing, using energy curable flexographic liquid inks.

BACKGROUND OF THE INVENTION

Multicolor printing processes typically require the sequential printing of a plurality of superposed single color ink layers. When high quality image reproduction is desired, it is important to avoid a previously applied ink layer mixing with a subsequently applied ink layer. Such layer mixing typically results in undesirable color rendition.

The art has addressed this problem in a number of different ways. The simplest way to prevent undesirable color mixing is to dry each applied ink layer prior to the application of a superposed next ink layer. While this method is effective it suffers a major disadvantage of requiring complete drying after applying each ink layer. Drying takes time and energy to accomplish, and as a result, productivity is reduced and production costs increase.

In an effort to speed up the printing process, wet trapping was developed. Wet trapping is a process whereby the ink layer deposited or applied at each inking station is not dried before the next ink layer is deposited thereover to produce a coloristic or visual effect. To implement wet trapping, it is important that the tack characteristics of the superposed ink layers be different.

Wet trapping is not a serious problem in offset printing, because the viscosity of the inks used in offset printing, ranges from 20,000 to 100,000 cps. Such high viscosity inks exhibit a wide range of tack characteristics that can be used to effect wet trapping without the need to dry the ink layers between inking stations.

In recent years, a form of printing that permits printing on various kinds of substrates, varying from cardboard to polyethylene to metal, has become widely accepted. This printing method is known as flexography.

Flexography employs a resilient printing plate having raised portions, which are coated with an ink and pressed against a substrate to transfer the ink to the substrate. In flexography, ink is transferred from a reservoir to the printing plate's raised surface through an intermediate transfer roll known in the art as an anilox roll. The anilox roll surface is covered by a plurality of tiny ink wells that fill with ink from the reservoir and transfer it to the flexographic printing plate. Obviously high quality printing requires that the flexographic printing plate surface be inked uniformly and consistently. This in turn requires that the anilox roll cells be small and that all of the anilox cells be filled each time with ink from the reservoir to substantially the same level.

Such requirement poses limitations on the fluidity or viscosity of the ink. A viscous ink will not be picked up as uniformly or consistently by the anilox roll and the flexographic printing plate surface will not be inked uniformly. The result has been that inks suitable for flexographic applications typically have viscosities under 2,000 cps, preferably less than 400 cps.

Current regulations regarding solvent emissions have resulted in the development of inks suitable for use in flexography that are energy curable. Such inks contain little or no solvent, and are fixed to the substrate not by drying but by curing via actinic radiation, such as ultraviolet light or electron beam. Their tack is very low and cannot be adequately measured with conventional instruments. Their viscosities are in the range of about 30 to 50 cps. While such viscosity range results in superior flexographic printing, energy-curable inks for flexographic applications exhibit very low tack, cannot be tack rated, and need be to cured between inking stations to prevent back transfer and mixing from the printed ink on the substrate to the inking rolls of subsequent stations. Such inter-station curing is expensive, as it requires substantial equipment modification. Such curing is also undesirable from a manufacturing stand point, as it increases the time required between the deposition of a subsequent ink layer in order to allow for curing of the previously deposited ink layer, thereby slowing down the printing process.

Wet trapping has also been proposed in flexographic printing based on the recognition that when depositing superposed multiple layers of ink, mixing will not occur if each layer is deposited over a layer having a higher viscosity than the newly deposited layer. The highest viscosity layer traps, so to speak, the second layer without mixing with or transfer of the underlying layer. However, with the range of viscosities available for flexographic printing inks, it is impractical to implement wet trapping using constantly decreasing ink viscosities for each layer that are sufficiently different from each previously applied layer viscosity in order to effect wet trapping, particularly as the number of applied layers increases. In essence, one runs out of available ink viscosities to implement wet trapping.

U.S. Pat. No. 5,690,028 attempts to solve the above mentioned problem of limited available ink viscosity range using a method of wet trapping in a multicolor printing application using energy curable inks, particularly suited for a central impression press. According to this patent, the energy curable inks are heated before being applied to a substrate, and are applied to the substrate at a temperature that is higher than the previously applied ink layer. Because the temperature of the previously applied ink layer on the substrate is cooler than the heated ink, the viscosity of the previously applied ink layer is lower than the viscosity of the applied ink. This viscosity differential causes the lower viscosity ink to unilaterally transfer onto the higher viscosity ink and prevents both back trapping and ink blending.

While this method of wet trapping achieves the desired result, it requires substantial modification to the existing printing press equipment to provide for heating units in each inking station before the ink is applied to the substrate, moreover, as the number of stations increases, so must the ink temperature in the successive inking stations. Thus, it may be necessary to apply cooling to the substrate, or the printing speed may have to be reduced, in order to prevent having to increase the ink temperature to levels that may adversely affect its properties.

There is, therefore, still a need for a method to implement wet trapping when using energy curable liquid flexographic inks where little or no modification of existing printing press equipment is required, yet still permitting high speed throughput.

SUMMARY OF THE INVENTION

According to this invention, there is provided a method for the flexographic printing of multiple superposed ink layers on a substrate using at least one energy curable ink and printing a second ink thereover without prior curing of the first printed energy curable ink.

The method for applying the multiple ink layers on a substrate to effectuate wet trapping comprises, in the following order:

(a) applying onto a substrate at least one ink layer of an energy curable liquid ink having a viscosity of less than about 4000 cps and comprised of a non reactive diluent, the applied ink layer of energy curable liquid ink having a first viscosity;

(b) evaporating at least a portion of the non-reactive diluent in the applied ink layer, thereby increasing the viscosity of the applied ink layer;

(c) applying onto the previously applied ink layer of increased viscosity, at least one non-energy curable ink layer having a viscosity lower than the increased viscosity of the previously applied ink layer; and (d) fixing both ink layers onto said substrate.

According to this invention, there is provided a method for printing multiple ink layers on a substrate, comprising selecting a first and a second aqueous energy curable liquid flexographic inks, each containing a non-reactive diluent in an amount of less than 50 wt. %, based on the weight of the ink composition, each ink having a viscosity under 4,000 cps and preferably between about 30 and 70 cps, and sequentially applying the first and second radiant energy curable liquid flexographic inks on a substrate to form first and second ink layers having superposed portions, wherein the second ink is applied after at least a portion of the non-reactive diluent in said first ink layer has evaporated.

There is also provided according to this invention apparatus for sequentially applying multiple superposed ink layers on a substrate, at least one of the ink layers being an energy curable liquid ink, having a viscosity under 4000 cps, in a way to practice wet trapping. The apparatus comprises:

(a) a substrate path and a substrate drive for driving said substrate along said predetermined path;

(b) a plurality of ink-applying stations spaced along said predetermined path, said ink-applying stations adapted to apply an ink comprising a non-reactive diluent and having a viscosity less than 4000 cps onto said substrate; and (c) a control system for controlling said substrate transport along said path so that a first liquid ink layer, applied onto said substrate at one of said ink stations, increases in viscosity through evaporation of at least some of said diluent from said first ink layer to a viscosity higher than a viscosity of a second ink applied over said first ink layer in a subsequent ink station spaced from said first ink station, to a viscosity sufficient to wet-trap said second liquid ink as said substrate is transported between said ink stations.

According to the present invention the steps of sequentially printing ink layers may be repeated a number of times, using multiple sequential printings of radiant energy curable inks, each time allowing some of the diluent in the printed layer to evaporate and thereby have its viscosity increase, before printing the next layer of ink.

Further in accordance with the present invention, the process of increasing the viscosity of a printed ink layer on the substrate to a second viscosity by allowing at least some of the diluent in the printed radiant energy curable ink layer to evaporate may be accelerated by the application of heat or by forcing a stream of air over the inked surface between subsequent ink applications.

DETAILED DESCRIPTION OF THE INVENTION

Figure 1:
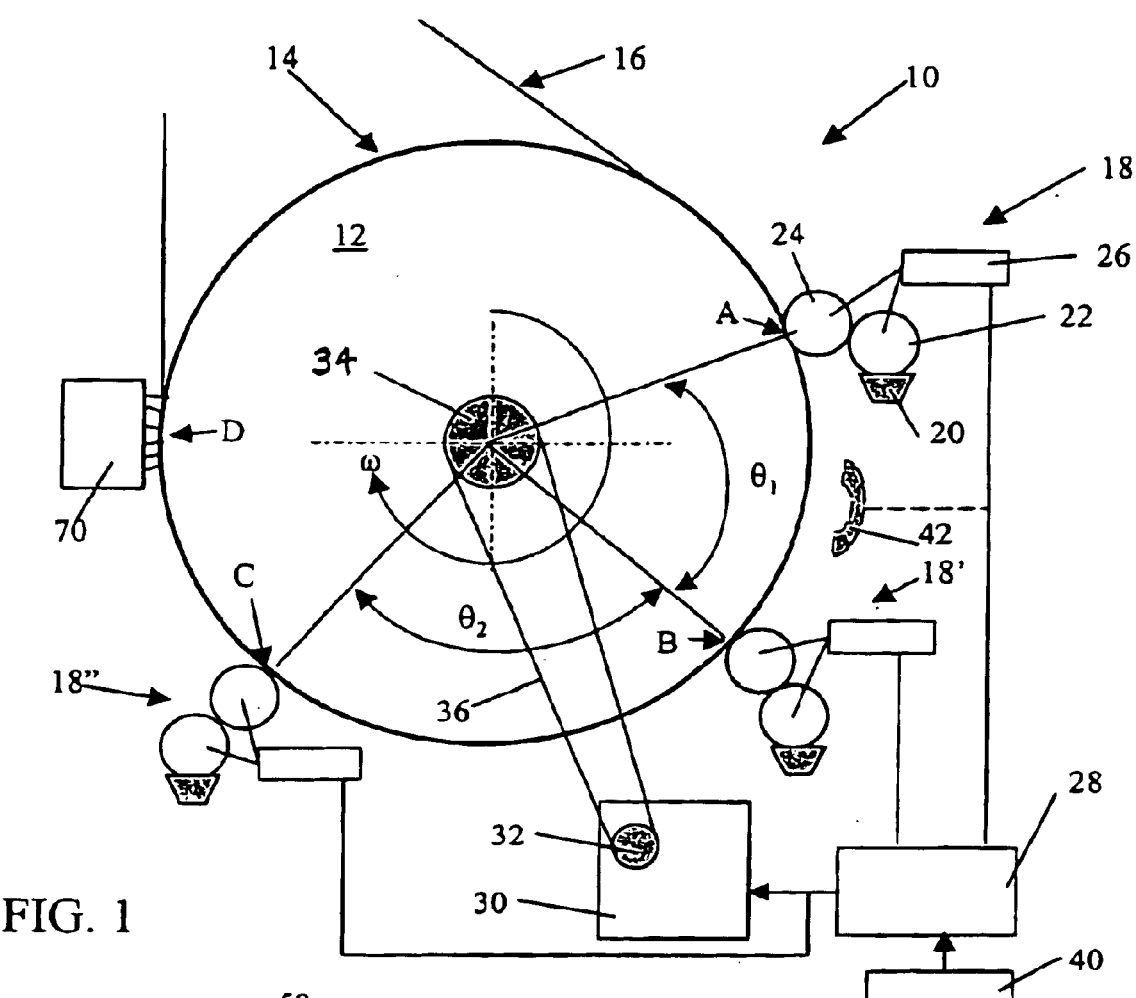
FIG. 1 shows a flexographic printing press for wet trapping, constructed according to the present invention.

The invention will next be described, where appropriate, with reference to the figures. Such figures are provided to facilitate an understanding of the invention, therefore, only such elements as are required for this understanding are illustrated and any equipment depicted is not drawn to scale nor is it intended to represent actual commercially used equipment.

The present invention relates to a novel process for implementing wet trapping of energy curable liquid flexographic inks in a flexographic printing environment, wherein the inks are formulated using energy curable single phase compositions, preferably aqueous based, such as those of the type disposed in co-pending U.S. patent application Ser. No. 60/380081, filed May 6, 2002, entitled "Single Phase Water-based Energy Curable Compositions And A Method of Preparing Coatings and Printing Inks With Same", the full contents of which is expressly incorporated herein by reference. Other, non-aqueous based composition, having similar characteristics may also be used. In contrast to other inks, although the aqueous energy curable liquid flexographic inks of above-mentioned co-pending application tend to exhibit minimal tack change as they dry, they exhibit viscosity changes sufficient to effectuate wet trapping on a flexographic press, as discussed below.

These aqueous energy-curable liquid flexographic inks are single-, ternary- or quaternary-compositions that contain a resin that is neutralizable by acid or base, and a non-reactive diluent, such as an organic solvent, water or a combination thereof. The non-reactive diluent is used to control the viscosity of the ink.

The single-phase compositions of this invention are energy curable. The term "energy-curable" composition, as used herein, is intended to mean compositions that are polymerizable or crosslinkable by the action of a radiant energy source of actinic radiation, such as ultraviolet radiation (UV), electron beam radiation (EB), and the like. As used herein "actinic radiation" is intended to encompass radiation having a wavelength range from about 190 nm to about 400 nm, and preferably from about 240 nm to 400 nm. Actinic radiation of this type may be obtained from a variety of sources, e.g., mercury arc lamps, xenon arc lamps, fluorescent lamps, monochromatic laser sources, and the like. Actinic radiation as used herein also is intended to encompass high-energy electrons, such as from electric discharge devices or electron beam devices.

In one embodiment of ink compositions suitable for use in the present invention, the non-reactive diluent is water. However compositions containing other non-reactive diluents, such as alcohol and mixtures of water and alcohol may be used, or any other suitable diluent offering sufficient volatility to permit enough diluent to evaporate within a reasonable time between the application of consecutive ink layers so that the viscosity of each applied ink layer will increase sufficiently compared with the viscosity of the newly applied ink layer to implement wet trapping of the newly printed layer to produce a coloristic or visual effect.

In practical terms, a water based ink composition is highly desirable, as its use complies with health and anti-pollution regulations that limit the amount of solvents permitted to escape in the environment. Therefore the present invention will be described using aqueous ink compositions, inasmuch as such compositions are the most likely to be used. Such limitation in the description of the invention is, however, not to be construed as limiting; and radiant energy curable inks of similar ink viscosity profiles and comparable non-reactive diluent evaporation characteristics are considered within the scope of the present invention.

The method provided by the present invention for applying multiple, at least partly superposed, ink layers on a substrate, relies on the rapid and relatively significant change in the viscosity of an energy curable liquid flexographic ink (which may be a water-based ink containing a diluent, such as water), after it has been deposited as a layer onto a substrate. Each ink layer is deposited onto the substrate in an inking station. There are as many inking stations as there are individual inks used in printing the color image. At each inking station, the ink is transferred from an ink reservoir through an anilox roll to a flexographic printing plate, such as a Cyrel® polymer printing plate produced by E. I. Dupont de Nemours and Company, Inc. The ink is then transferred from the printing plate onto a receiving substrate, such as a web or sheet of polyethylene terephthalate film, or any other substrate, which may be printed with a flexographic printing plate.

The initial viscosity of a liquid flexographic ink deposited onto the substrate is typically under 4000 cps, and preferably under 70 cps, although ink viscosities of 2,000 cps may be used, depending on the particular printing application. As discussed earlier, this very low viscosity is preferred in order to achieve good ink transfer from the ink reservoir through the anilox roll to the printing plate surface.

Once the ink has been deposited onto the substrate, the non-reactive diluent begins to evaporate. The evaporation rate is a function of the non-reactive diluent selected, along with the ambient conditions of temperature, barometric pressure, and relative humidity. Evaporation is also assisted by the use of increased air circulation over the ink layer applied to the substrate, which may include air which is blown over the substrate, and by the addition of heat, supplied either by heating the forced air stream blown over the substrate, or from infrared lamps and the like. Based on the type of printing ink selected, the removal of even a small amount of the non-reactive diluent results in significant change in the ink viscosity of the deposited ink layer.

By the time the ink layer arrives at the next inking station, where another ink layer, typically of a different color, is deposited on the substrate and over at least portions, if not all, of the previously deposited ink layer, the ink viscosity of the deposited ink layer will have increased sufficiently to wet-trap that ink layer without back trapping the newly deposited ink, having a viscosity typically in the same range as that of the earlier deposited ink at the time of its deposition. Therefore, by selecting energy curable inks containing small amounts of a viscosity controlling non-reactive diluent, such as water, wet trapping of multiple ink layers can be implemented without the need to change ink viscosity by heating the ink, or chilling the substrate containing the ink layer, between inking stations, or curing the ink between inking stations.

According to the present invention, once all ink layers have been applied, a single curing step with a proper energy curing source is sufficient to fix all applied layers.

The present wet trapping process is not limited to the use of energy curable liquid flexographic inks, but may encompass the use of at least one layer of non-energy curable ink. For example, a layer of an energy curable liquid flexographic ink of the type disclosed above may be applied and the application of this layer to the substrate maybe followed by the application of a layer of a non-energy curable liquid flexographic ink, this second layer having a viscosity that is less than the increased viscosity (through the evaporation of all or part of the diluent) of the first layer. Again, because of the viscosity differential, wet trapping may be implemented. If this second layer is the uppermost or last printed layer, all ink layers may be then be cured and dried via conventional drying means and methods, to simultaneously fix the deposited ink layers onto the substrate.

In yet another embodiment of the present invention, a number of energy curable and traditional ink layers may be inked in superposed fashion and still employ the wet-trapping technique of this invention. For example, as stated above, a first energy curable ink, having a first viscosity, may be applied as a first layer. A traditional ink layer, having a lower viscosity than the increased viscosity of the first ink layer, may then be applied over the increased viscosity layer at a subsequent inking station to form a second layer. A third layer may next be applied over the second layer using a second energy curable ink having a lower viscosity than the viscosity of the second layer. The viscosity of this layer will again increase as the non-reactive diluent evaporates before reaching the next inking station. At the fourth inking station, a fourth layer may be applied over the third layer using yet another energy curable ink having a lower viscosity than the increased viscosity of the third layer. Drying of the conventional ink layer may be implemented if the conventional ink layer viscosity is so low that energy curable ink with lower viscosity is not available. Thus it is possible to implement the process of the present invention in what may be referred to as a "hybrid" process, whereby only a number of ink layers are implemented by viscosity gradient wet-trapping according to this invention, and wherein certain layers are dried or cured prior to the application of additional ink layers, using combinations of inks. Such a hybrid process, however, while possible and within the scope of the present invention, is less efficient than a process wherein all applied layers are an energy curable liquid flexographic ink.

FIG. 1 shows an apparatus of the present invention. The apparatus 10 shown in this figure is similar to a central impression press which is a press often used by the flexographic printing industry to print multiple images comprising a plurality of ink layers having at least some superposed inked areas. Because the technology for building such apparatus is well known in the art, only those elements that have been incorporated in this apparatus to transform a standard central impression press into a flexographic printing press capable of carrying out wet trapping when applying superposed liquid ink layers are discussed.

As shown in FIG. 1 the apparatus 10 includes a substrate supporting cylindrical drum 12 having an outer peripheral surface 14. Around the drum 12 peripheral surface 14, there are positioned a number of inking stations 18 spaced along the surface. While three such stations are illustrated, such number is for illustration purpose only and fewer or more stations may be placed around the drum without detracting from the scope of this invention.

Each of the inking stations comprises an ink reservoir 20, an inking roll 22 and a printing plate holding roll 24. The inking roll is, preferably, an anilox roll and is placed so as to receive ink from the ink reservoir and transfer it to a printing plate mounted on the printing roll. The printing roll is positioned with respect to the drum 12 so that it applies an ink layer onto a web 16 carried by the drum 12 at a point of contact "A", "B", and "C" respectively for each station illustrated. Inking stations such as described here are well known in the art and commonly used in central impression presses, therefore no further description is given herein except to state that such inking station must be capable of handling liquid inks having viscosities well below 4,000 cps.

An energy curing or ink fixing station 70 is preferably also placed along the web 16 path around the drum 12 at a position that is after the last inking station. Such curing stations are also well known in the art and also require no further description except to state that in selecting a curing station for use in accordance with the present invention, such station must have an energy output of the type required to cure the liquid inks used in practicing this invention.

The substrate supporting drum 12 is rotationally driven at a speed of rotation ω rpms, using a drive that may comprise belt 36 and pulleys 32 and 34 driven by a motor 30. Such drive permits changing the speed of rotation ω, for example, by changing the relative size of the pulleys 32 and 34, or by changing the rotational speed of pulley 32 driven by motor 30. The drive shown is for illustration rather than it being limiting, and other drives known in the art for altering the speed of rotation of drum 12 may be used within the scope of this invention, including direct coupling of a variable speed motor to the drum, or connection of a driving motor to the drum through a gear box, and so on.

In accordance with the present invention, there is further provided to this apparatus a control system generally indicated by a central control 28, local controls 26, and a user interface 40. This control system is used to control the apparatus so that a first liquid ink layer applied onto the web 16 at the first inking station 18 at point "A" will have its viscosity increase through evaporation of at least some of the non-reactive diluent to a viscosity higher than the viscosity of a second ink to be applied over it at the subsequent inking station 18' at point "B" to a viscosity that is sufficient to wet trap the second liquid ink.

The control system may achieve this result in any one of a plurality of ways. In the simplest manner, inking stations 18, 18' and 18" are all fixed in position around drum 12 at certain angular spacing, $\theta_1$, $\theta_2$ etc. The control system in this case adjusts the speed of rotation ω of the drum as a function of the time required for the desired viscosity change through evaporation in a layer coated at point "A", so that the layer coated at point "A" arrives at point "B" with a viscosity sufficiently high to wet trap the ink layer applied thereover at point "B".

The required time is a function of the desired viscosity change, which is a function of: the type of liquid ink used in the two inking stations, the thickness of the layer coated at the first inking station, and the ambient environmental conditions, which affect evaporation. It can be determined experimentally for different inks and applied ink layer thickness. Preferably this data is derived prior to beginning a printing job and is available to the operator of the apparatus.

The data may be stored in an electronic memory (included in block 28), which is part of the control system and is indexed to the type of ink used in each inking station and the thickness of the ink layer to be applied at each inking station. Thus, an operator can readily access rotational speed information simply by inputting to the control system, through an interface 40, the type of ink and ink layer thickness to be applied at inking stations 18 and 18'.

When more than two inking stations are used, as is most likely the case in actual commercial printing, such control system may be programmed to compute an average speed for the drum 12 which will transport the web between stations 18, 18' 18" etc. at the required time for the ink layers to achieve the requisite evaporation necessary to produce the proper viscosity increase to effect web trapping at all inking stations.

The control system may also comprise moveable inking stations, which can be moved along the web transport path on the drum surface, thereby changing the angular spacing $\theta_1$, $\theta_2$ etc. between stations. Such change may be done manually or may be provided automatically using individual position drives 26 on each inking station as part of the control system.

The control system may also include both a variable speed drive and a variable position drive, so that both the spacing of the inking stations and the speed of rotation ω of the drum can be adjustable to satisfy the requirement that the viscosity of each deposited ink layer increases sufficiently through evaporation to a point where such ink layer wet-traps a subsequent ink layer deposited thereover.

The control system in such arrangement, preferably, contains viscosity change data stored in a memory. This data is indexed in a manner that provides spacing and speed of rotation information to an operator following entry of the ink type and the intended thickness of the applied layer for a printing job. This may be readily achieved using a programmed CPU, an input device such as a keyboard, a memory and a display device, as is well known in the art. In an alternative control system, the CPU may control directly both the rotational speed of the drum and the positioning mechanism of the ink stations using, for example, the positioning drives 26 associated with the inking stations, based on the input data regarding the inks and layer thickness to be used.

Optionally, elements 42 that assist the evaporation of the non-reactive diluent may be placed between inking stations. Such elements may be heating elements or air blowing elements or combinations thereof, and do not include the usual solvent recovery equipment typical of the prior art inter-stage dryers. Contrary to the prior art's required use of inter-station drying elements, these elements are contemplated for optional use with this invention and are not used to dry the applied ink layer but only are employed to facilitate the evaporation process so as to increase the applied ink layer viscosity as the layer is transported between inking stations. Therefore, such elements, when present, do not consume the amounts of energy required to dry the applied ink film. Additionally such elements do not tend to heat the drum surface. As a result, equipment built in accordance with this invention does not require special drum cooling systems, as is typical of the central impression presses of the prior art which, it superficially resembles.

Figure 2:
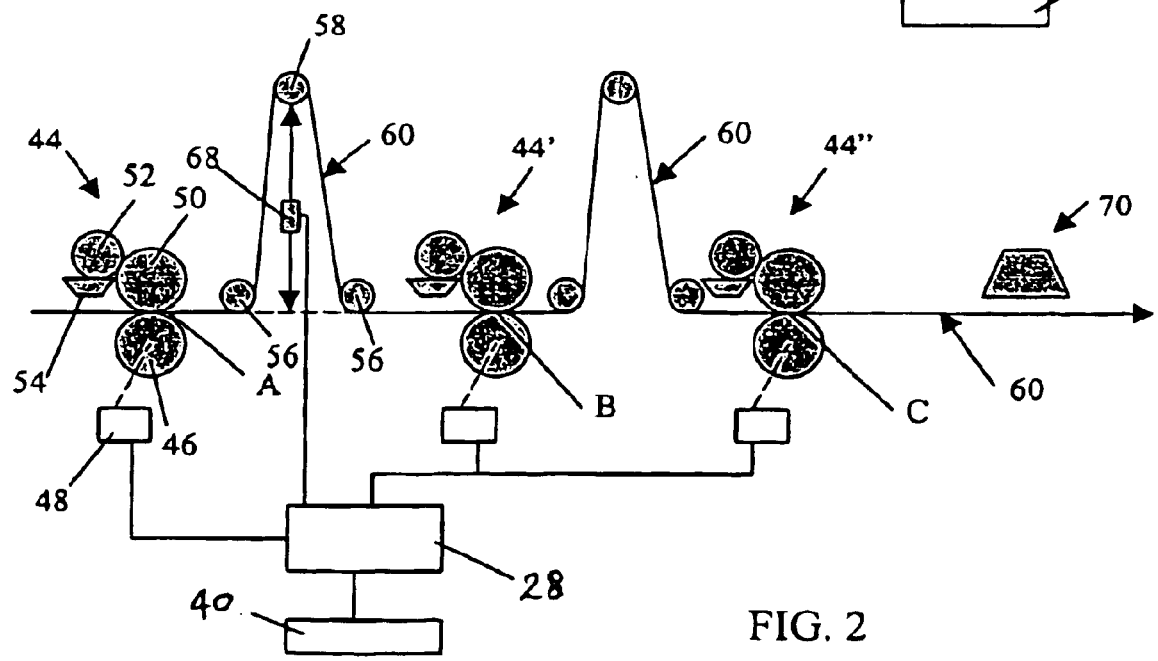
FIG. 2 shows an alternate embodiment of apparatus for wet trapping in accordance with this invention.

Equipment according to the present invention need not be similar to the central impression press as shown in FIG. 1, but, as shown in FIG. 2, this invention may be practiced with in-line type press comprising a number of ink applying presses or inking stations 44, each comprising a substrate support or back-up roll 46 connected to a drive 48, and a printing plate mounting roll 50, which rotates in contact with the substrate surface. An ink transfer roll 52, such as an anilox roll is used to transfer ink from an ink reservoir 54 to a printing plate mounted on the mounting roll 50.

The substrate is guided through a plurality of web guiding rollers 56, 58 along a path 60 that drives the substrate sequentially and serially through any number of inking stations 44 of the type described. The guiding rollers may include web guiding rollers 56 that are, preferably, non-contacting web-turning rollers, such as air bars. Such non-contacting rollers or air bars are well known in the art and need no further description. See for example U.S. Pat. No. 5,640,784 describing a non-contact flotation web guide/dryer.

As described earlier in connection with FIG. 1 the printing apparatus of FIG. 2 also includes a control system 28, which again may be used to change the substrate transport speed so that the substrate arrives at the different ink applying stations 44, 44", and 44"" after a sufficient time has elapsed following the application of an ink layer for enough of the non-reactive diluent in the applied ink layer to have evaporated so that the applied ink layer viscosity has increased sufficient to trap the next applied ink layer as the substrate arrives at points A, B and C. As discussed in connection with FIG. 1, the speed may be changed by use of variable speed motors driving the web transport, or by a change in gear ratios in the web drive. The speed may be accomplished manually or automatically and is preferably based on pre-determined tables showing the relationship between viscosity changes as a function of coating thickness type of ink used, and optionally, ambient conditions.

Again as described in the case of the apparatus illustrated in FIG. 1, the control system 62 may comprise a way to alter the path length between stations. This may be achieved by provision for manually adjusting the distance that the substrate travels between inking stations, as for example, by raising roller 58, or by moving the inking stations further apart. Roller 58 may be raised automatically by the control system through a piston 68 or other similar method. Alternatively, the inking stations may be moveably supported on a guide frame, not illustrated, and be able to slide along the substrate path. Such mechanical arrangements are well known in the art.

In practice using either the apparatus of FIG. 1 or 2, a substrate web is driven past the numerous ink applying stations. Prior to beginning the ink applying process, the operator determines the time required for each applied ink layer viscosity to increase to the desired trapping level after that layer is applied onto the substrate and before the next layer is applied thereover. The operator will determine this time on the basis of viscosity change data for each ink under the ambient conditions during ink application. This is best done using predetermined data tables, which may be printed lists or information stored in the control system memory, when such memory is available.

Following selection of the delay time between layer applications, the operator will set the drive speed or the station spacing or both to obtain the needed delay time for the applied ink layer viscosity to rise sufficiently (via evaporation of the non-reactive diluent) to effectuate wet trapping. When a CPU and memory containing the component and viscosity profile data for the inks used are available, the control system may set the proper speed and/or station spacing automatically upon operator input of the types of ink used and the ambient conditions.

Both the apparatus of FIGS. 1 and 2 may include an ink fixing station 70 following the last ink applying station where energy is applied to the energy curable ink layers to fix the layers onto the substrate as an integral part thereof. Depending on the nature of the energy curable inks the fixing station may be an ultra violet (UV) light energy source, an electron beam source, or other appropriate energy source.

The following examples illustrate the invention. The examples use multiple colors (yellow, blue, black and white) of energy curable, water based flexographic inks printed on a non-porous substrate polyethylene film using a conventional Central Impression Flexographic Press without interstation drying or curing. All percentages, unless otherwise noted, are weight percentages based on the total weight of the ink composition.

EXAMPLE 1

The press used was a six color wide web central impression flexo press for solvent based inks made by Kidder Inc., equipped with a reverse angle chamber doctor blade system, a coating station after the central impression inking stations, and a Fusion 200–600 watt/inch UV H-bulb curing station. The print stations on the press are located around a central cylinder. The spacing of the print stations around the central cylinder is as follows:

Distance between Station 1 and 2, 24.9 inch;

Between Stations 2 and 3 28.9 inch;

Between Stations 3 and 4 36.3 inch;

Between Stations 4 and 5 28.9 inch and

Between Stations 5 and 6 24.9 inch.

The distance between the last inking Station and the curing unit was about 12 feet.

The print stations were set up with water-based energy curable inks. For printing plates, solid Dupont Cyrel® photopolymer flexographic plates were used. Chamber doctor blades and anilox rollers with varying lines per inch counts were also used. In this example, inking station 1 was not used. Inking station 2 contained a yellow ink of the following composition:

12.5% yellow pigment (GW-A Yellow, manufactured by Clariant Corporation)

30.6% water-soluble, ethylenically unsaturated resin (resin manufactured by Sun Chemical Co., Inc., Fort Lee, N.J., resin 924–1069, and described in WO 99/19369)

6.3% hyperdispersant (Solspers 41090, manufactured by Avecia)

0.3% silicone defoamer (Byk 019, manufactured by Byk-Chemie)

26.2% water-soluble, ethylenically unsaturated oligomer (available under the trade name Laromer 8765, manufactured by BASF Corporation)

2.2% water-insoluble, ethylenically unsaturated oligomer (Sartomer SR 610, manufactured by Sartomer Corporation)

5.0% photoinitiator (available under the trade name Irgacure 500, manufactured by Ciba Specialty Additives)

1.1% silicone flow additive (available under the trade name DC 57, manufactured by Dow Coming) and 16.0% water Inking station 3 was not used. Inking station 4 contained a blue ink of the following composition:

15.0% blue pigment (available under the trade name Sunfast 249–1290, manufactured by Sun Chemical Co., Fort Lee, N.J.)

30.4% water-soluble, ethylenically unsaturated resin (resin 924–1069, manufactured by Sun Chemical Co.)

0.5% ammonia (27–30% conc. in water)

6.3% hyperdispersant (Solspers 41090, manufactured by Avecia)

0.3% silicone defoamer (Byk 019, manufactured by Byk-Chemie)

26.1% water-soluble, ethylenically unsaturated oligomer (available under the trade name Laromer 8765, manufactured by BASF Corporation)

2.1% water-insoluble, ethylenically unsaturated oligomer (Sartomer SR 610, manufactured by Sartomer Corporation)

5.0% photoinitiator (available under the trade name Irgacure 500, manufactured by Ciba Specialty Additives)

1.1% silicone flow additive (available under the trade name DC 57, manufactured by Dow Coming) and 13.5% water Inking station 5 contained a black ink of the following composition:

15.0% carbon black pigment (Printex 35, manufactured by Degussa)

30.4% water-soluble, ethylenically unsaturated resin (resin 924–1069, manufactured by Sun Chemical Co.)

0.5% ammonia (27–30% conc. in water)

6.3% hyperdispersant (Solspers 41090, manufactured by Avecia)

0.3% silicone defoamer (Byk 019, manufactured by Byk-Chemie)

26.1% water-soluble, ethylenically unsaturated oligomer (available under the trade name Laromer 8765, manufactured by BASF Corporation)

2.1% water-insoluble, ethylenically unsaturated oligomer (Sartomer SR 610, manufactured by Sartomer Corporation)

5.0% photoinitiator (available under the trade name Irgacure 500, manufactured by Ciba Specialty Additives)

1.1% silicone flow additive (available under the trade name DC 57, manufactured by Dow Coming) and 13.5% water Finally, inking station 6 contained a white ink of the following composition:

33.8% white pigment (Tioxide R-HD6X, manufactured by Tioxide Corporation)

9.0% water-soluble, ethylenically unsaturated resin (resin 924–1069, manufactured by Sun Chemical Co.)

0.3% hyperdispersant (Solspers 41090, manufactured by Avecia)

0.3% silicone defoamer (Byk 019, manufactured by Byk-Chemie)

26.1% water-soluble, ethylenically unsaturated oligomer (available under the trade name Laromer 8765, manufactured by BASF Corporation) and 30.5% water Inking stations 2, 4, and 5 were equipped with 800 line per inch anilox roller and the printing plates used were DuPont® Cyrel® photopolymer flexographic plates. The plates had a test image containing color areas in varying densities, solid plate trap areas and an image. Inking station 6 was equipped with a 360 lines per inch anilox roller and a solid printing Cyrel® photopolymer flexographic plate. The solid plate was covering and trapping the entire test plate as described for the other stations.

Wet trapping was performed on low-density transparent polyethylene film. Trapping and cure were tested at different line speeds. On press, the trapped colors was checked visually, the cure by test of finger dryness, the back trapping visually by controlling the back pumped ink for tinting. After the trial, the inks were examined. They were found with no tinting. The inks in the image and trapping print areas perfectly wet-trapped over each other without back trapping. The image showed the desired design and the trapping colors showed the desired shade and intensity. The ink cured completely at all tested cure conditions for all single colors, white and in the trapped areas. The maximum line speed tested was 1000 fpm, which exemplifies a wet-trap speed of 0.1245 s between two stations (Inking stations 5 and 6).

The printed and cured inks were afterwards tested for SWOP color density and for chromaticity diagram values ($D_{65}^2/L^*$, a*, b* mode) with an X-Rite® Press Check. All colors printed with high density. The trapped colors also showed the desired trap color densities. This indicates that the transfer of all colors on each other and white as backing color is sufficient. No backtracking or tinting has been observed in any of the colors or white.

Additional tests in the form of industry standard alcohol and water rub tests, as well as industry standard tape release adhesion tests, were conducted. The prints passed all adhesion tests in all print areas. The resistance properties were dependent on the cure condition, but generally rated as good.

EXAMPLE 2

Using the same equipment as in Example 1, the second inking station was loaded with a yellow ink of the following composition:

13.30% yellow pigment (GW-A Yellow)

12.07% water-soluble, ethylenically unsaturated resin (resin 924–1069)

6.65% hyperdispersant (Solspers 41090)

0.27% silicone defoamer (Byk 019)

0.53% ammonia (30% conc. in water)

7.65% water-insoluble, ethylenically unsaturated oligomer (Sartomer SR 610)

38.55% water-soluble, ethylenically unsaturated oligomer (Laromer 8765)

4.0% photoinitiator (Irgacure 500)

1.10% silicone flow additive (DC 57) and 15.68% water.

Inking station 5 was loaded with a blue ink of the following composition:

15.96% blue pigment (Sunfast 249–1290)

10.92% water-soluble, ethylenically unsaturated resin (resin 924–1069)

6.65% hyperdispersant (Solspers 41090)

0.27% silicone defoamer (Byk 019)

0.53% ammonia (30% conc. in water)

7.42% water-insoluble, ethylenically unsaturated oligomer (Sartomer SR 610)

38.32% water-soluble, ethylenically unsaturated oligomer (Laromer 8765)

5.0% photoinitiator (Irgacure 500)

1.1% silicone flow additive (DC 57) and 14.63% water.

The inking stations were equipped with 550 lines per inch anilox roller and DuPont® Cyrel photopolymer flexographic plates were used. The prints had solid plate areas of 4.5 inch by 7 inch and with a trapping area of 2 inch by 6 inch. The substrate was low-density transparent polyethylene film. Trapping and curing were tested at different line speeds. On press, the trapped color was checked visually, the cure by test of finger dryness, the back trapping visually by controlling the back pumped ink for tinting. After the trial, the inks were examined. They were found to be perfectly wet trapped over each other without back trapping and with color intensity according to the transfer at given speeds. The ink cured completely at all tested cure conditions on the blue, yellow and the trapped green print area. The maximum line speed tested was 1000 fpm the lowest UV dose rate was 200 watt per inch at 300 fpm line speed.

EXAMPLE 3

Using the same inks, substrate and equipment as in Example 2, the colors were reversed so that the blue ink was in inking station 2 and the yellow ink in inking station 5. Each inking station was equipped with 550 lines per inch anilox roller and DuPont® Cyrel photopolymer flexographic plates were used. The prints had solid plate areas of 4.5 inch by 7 inch and with a trapping area of 2 inch by 6 inch. The trapping was tested as described in Example 2. There was no visual color difference in the trapped area (green). The above described chromaticity values taken with the X-Rite Press Check confirmed this result. The values were within the error of the measurement. This indicates that the transfer of yellow ink on blue ink is as sufficient as it is vice versa, and no backtracking or tinting has been observed.

Those having the benefit of this disclosure may implement numerous variations and combinations such as different inks and the addition of drying and of curing stations between inking stations. Such alternatives or variations are to be construed as being within the scope of my inventions in which we claim:

What is claimed is:

1. A method for applying multiple ink layers on a substrate, said method comprising:
    A. applying onto said substrate at least one ink layer of an energy curable liquid ink having a viscosity of less than about 4000 cps and comprised of a non-reactive diluent, with each of said at least one applied ink layer having a first viscosity;
    B. evaporating at least a portion of said non-reactive diluent in each of said at least one applied energy curable ink layer, thereby increasing the viscosity of the said at least one applied energy curable ink layer;
    C. applying onto a last said previously applied ink layer of said energy curable liquid ink, of increased viscosity, at least one layer of a non-energy curable liquid ink having a viscosity lower than said increased viscosity of said last previously applied energy curable ink layer; and
    D. fixing each of said applied energy curable and non-energy curable ink layers onto said substrate.

2. The method of claim 1 wherein said diluent comprises water.

3. The method of claim 1 wherein between about 5 wt. % and 50 wt. % of said diluent comprises water.

4. The method of claim 1 wherein step A is performed in a first inking station and step C is performed in a subsequent inking station, and wherein said substrate is transported between said first inking station and said subsequent inking station at a speed sufficient to allow some of the diluent in said ink layer to evaporate, thereby increasing said ink layer viscosity sufficiently to permit trapping of said other ink layer applied over said increased viscosity layer.

5. The method of claim 1 wherein heat is applied to said applied ink layer to assist in removing some of the diluent at a rate faster than the evaporation rate of the diluent under ambient room conditions of temperature and humidity.

6. The method of claim 1 wherein an air stream is applied to said printed ink layer to assist in removing some of the diluent at a rate faster than the evaporation rate of the diluent under ambient room conditions of temperature and humidity.

7. The method according to claim 1 wherein step C may be repeated at least one more time following step D, applying an additional ink layer over said fixed layers wherein said additional ink layer is also fixed onto said substrate.

8. The method according to claim 1 wherein following step D there is applied at least one more ink layer using a radiant energy curable liquid ink having an ink viscosity less than about 4000 cps and comprising a diluent comprising water.

9. The method according to claim 1 wherein following step D, steps A, B, C and D are repeated at least one more time.

10. A method for applying multiple ink layers on a substrate, said method comprising:
    A. applying onto said substrate an ink layer of an energy curable liquid ink having a viscosity of less than about 4000 cps and comprised of a non-reactive diluent, said applied ink layer having a first viscosity;
    B. evaporating at least a portion of said non-reactive diluent in the applied energy curable ink layer, thereby increasing the viscosity of said applied energy curable ink layer;
    C. applying onto said previously applied ink layer of said energy curable liquid ink, of increased viscosity, another layer of an energy curable liquid ink having a viscosity lower than said increased viscosity of said previously applied energy curable ink layer; and
    D. fixing each said applied energy curable ink layer onto said substrate.

11. The method of claim 10 wherein said diluent is water.

12. The method of claim 10 wherein between about 5. % and 50. % of said diluent, in each of said inks is comprised water.

13. The method of claim 10 wherein step A is performed in a first inking station and step C is performed in a subsequent inking station, and wherein said substrate is transported between said first inking station and said subsequent inking station at a speed sufficient to allow some of the diluent in said ink layer to evaporate, thereby increasing said ink layer viscosity sufficiently to permit trapping of said other ink layer applied over said increased viscosity layer.

14. The method of claim 10 wherein heat is applied to said applied ink layer to assist in removing some of the diluent at a rate faster than the evaporation rate of the diluent under ambient room conditions of temperature and humidity.

15. The method of claim 10 wherein an air stream is applied to said printed ink layer to assist in removing some of the diluent at a rate faster than the evaporation rate of the diluent under ambient room conditions of temperature and humidity.

16. The method according to claim 10 further comprising repeating steps B and C one or more times, each time using a different radiant energy curable liquid ink having a viscosity less than about 4,000 cps, to apply an ink layer over a previously applied ink layer viscosity.

17. The method according to claim 10 wherein step D comprises simultaneously curing both layers using radiant energy.

18. The method of claim 10 wherein the radiant energy curable liquid inks comprise a ternary radiation-curable, aqueous composition comprising: a one phase solution comprising:

A. water;

B. a partially water-soluble oligomer; and,

C. a water-soluble, ethyleneically unsaturated olymeric solubilizing resin containing partially or totally neutralized acidic or basic functional groups; wherein the partially water-soluble oligomer is completely miscible with the solubilizing resin.

19. The method of claim 18 wherein the functional groups of the polymeric solubilizing resin are carboxylic acid groups which are neutralizable with a base, and the ethylinically unsaturated polymeric solubilizing resin is a water soluble, ethyleically unsaturated polymeric ammonium salt somposition comprising the neutralization product of an ethyleinically unsaturated tertiary amine and an ethyleinacally unsaturated polymeric resin containing acidic functional groups.

20. The method of claim 10 wherein step A is performed in a first inking station and step C is performed in a subsequent inking station, and wherein said substrate is transported between said first inking station and said subsequent inking station at a speed sufficient to allow some of the diluent in said ink layer to evaporate, thereby increasing said ink layer viscosity sufficiently to permit trapping of said other ink layer applied over said increased viscosity layer.

21. The method of claim 20 wherein said inks are energy curable liquid flexographic inks and wherein said inking stations are flexographic inking stations.

22. A method for printing multiple ink layers on a substrate, said method comprising selecting a first and a second energy curable liquid flexographic ink, each containing a viscosity controlling diluent comprising water in an amount of about between 5. % and 50. % by weight, each having a viscosity between about 30 and 70 cps, and sequentially applying said first and said second radiant energy curable liquid flexographic inks on a substrate to form first and second ink layers having superposed portions, wherein said second ink is applied after at least a portion of said diluent in said first ink layer has evaporated.

* * * * *